United States Patent
Harris et al.

[15] 3,681,774
[45] Aug. 1, 1972

[54] TWO-VARIABLE STRIP CHART RECORDER

[72] Inventors: George J. Harris, Framingham; William D. Richards, Medway, both of Mass.

[73] Assignee: American Optical Corporation, Southbridge, Mass.

[22] Filed: Jan. 26, 1971

[21] Appl. No.: 109,904

[52] U.S. Cl..................346/62, 128/2.06 G, 346/76
[51] Int. Cl...............................................G01d 9/34
[58] Field of Search..............346/62, 34, 76, 33 ME; 128/2.06 G

[56] References Cited

UNITED STATES PATENTS 3,478,364  11/1969  Frank..........................346/62
3,573,843  4/1971  Solley..........................346/62

*Primary Examiner*—Joseph W. Hartary
*Attorney*—Robert J. Bird, Joel Wall, William C. Nealon and Noble S. Williams

[57] ABSTRACT

A single-pen, two-variable recorder using a heat-sensitive paper and a heated pen. The paper moves at a fixed rate and ordinarily a first continuous signal is recorded. At periodic intervals, samples are taken of a second signal and the pen is used to scribe bars (in the form of a bar graph) with the length of each bar corresponding to the amplitude of a respective sample. While a bar is being recorded, the pen moves relatively fast. This results in lighter lines for the bar graph than for the continuous trace, and allows a fast sampling rate relative to the paper speed without having the bar graph obscure the graticule markings on the paper.

28 Claims, 5 Drawing Figures

INVENTORS
GEORGE J. HARRIS
WILLIAM D. RICHARDS

BY  *Joel Wall*

AGENT

TWO-VARIABLE STRIP CHART RECORDER

This invention relates to strip chart recorders, and more particularly to single-pen, two-variable strip chart recorders.

In a strip chart recorder, a paper strip is continuously fed at a constant rate from a roll above a recording surface. A pen bears against the paper on the recording surface and is driven, in accordance with the signal to be recorded, in a direction perpendicular to the direction of paper movement. Thus, on the final recording, the time axis is along the length of the paper strip and the variable is represented by the distance of each point on the trace from a base line in a direction perpendicular to the time axis. The distance of each point from the base line is dependent upon the magnitude of the signal (i,e., the magnitude of the pen deflection) at one instant during the recording.

If two signals are to be recorded simultaneously, two pens may be provided with each signal controlling the deflection of a respective pen. In such a case, the paper must be sufficiently wide so that the signals do not cause the traces to overlap; otherwise, the two pens will hit each other and neither signal will be recorded properly. One disadvantage of two-pen recorders is that they are generally more expensive than single-pen recorders. Another disadvantage is that the two traces are often separated so far from each other that it is difficult to correlate points on the two traces.

Instead of using two pens, it is possible to use a single pen which is time-shared by two (or more) channels. The two signals to be recorded can be applied alternately to the pen deflection drive circuit. The pen normally is kept at a small distance from the paper. Each time one of the two signals is applied to the pen deflection drive circuit and the pen moves to a position to be marked on the respective trace, the pen may be brought into contact with the paper to produce a mark. If the movement of the pen up and down relative to the paper is synchronized to the sampling of the two signals, each trace will consist of a series of marks corresponding to the respective signal. Instead of moving the pen up and down relative to the paper, it is also possible to employ a specially treated paper which is sensitive to high voltage discharges. The pen may be kept at a fixed distance from the paper, and to record a mark a high voltage pulse is applied to the pen. (This type of recording is known as "electrostatic recording".) The major problem with this form of recording is that a sampled trace is almost always less clear than a continuous trace.

Instead of recording two sampled traces, it is often advantageous with a single-pen recorder to develop two different kinds of traces. One of these may be the usual type of continuous recording. The other may be a bar or a line graph which consists of a series of bars perpendicular to the direction of movement of the paper. Each bar has one of its ends on a base line, and the height of the bar represents the amplitude of the respective signal at the time the bar was drawn. The bars should be separated from each other by some finite distance so that the height of each bar at any time can be determined. While the first signal is recorded almost continuously on the paper strip (the discontinuities as a result of the drawing of the bars at periodic intervals may not even be observable), the second signal is sampled only periodically with each sample causing a bar of proportional length to be recorded. One of the advantages of this type of recording is that the two traces may overlap, that is, the continuous trace may be drawn right through the series of bars. In this manner, correlation between the two signals is easily observed. (For example, if on one section of the paper all of the bars are relatively long while the amplitude of the continuous trace is quite low, this relationship is immediately evident.) Furthermore, because the two signals result in completely different types of recording, the recordings can be distinguished quite easily from each other.

This kind of dual recording with a single pen has not been exploited commercially on a large scale for the following reason. The individual bars or lines must be separated from each other in order for the bar graph to be interpreted. But unless the paper is moved very fast (thereby consuming large quantities), or unless the signal to be sampled is sampled at widely separated intervals, the bars will be very close to each other. The paper strip is almost always provided with horizontal and vertical graticule lines so that the values of the abscissa (time), and ordinate (signal amplitude) of any point on the continuous trace or the top of any bar, can be determined easily. But if the bars are recorded close to each other, they may completely obscure the vertical and horizontal graticule lines. In such a case, it is very difficult to determine the length of any bar. And if the bars are to be separated sufficiently so that the graticule lines are not masked, either the paper must be fed at a fast rate, or the sampled signal must be sampled only infrequently.

It is an object of our invention to provide a single-pen, two-variable strip chart recorder for recording a continuous trace and a bar graph which does not suffer from the disadvantages described above.

Briefly, in the illustrative embodiment of our invention, we employ a conventional strip chart recorder which utilizes heat-sensitive paper. The "pen" is a heated stylus which "burns" the paper when it comes into contact with it. The stylus is normally employed to record a continuous trace of a first signal. Periodically, the stylus is lifted from the paper and a sample is taken of a second signal. The stylus is deflected to the top of the next line to be drawn and then quickly moves across the width of the paper to the base line. When the base line is reached, the stylus is lifted and returned to a position determined by the first signal, at which time it is lowered once again and is used to record the first signal.

The density (darkness) of any line recorded on the heat-sensitive paper depends upon the speed of stylus movement across the paper. The faster the speed of the stylus, the lighter the line which is drawn. Although the pen moves slowly relative to the paper while the continuous trace is being drawn, it moves very fast relative to the paper when a bar is being drawn following the sampling of the second signal. Because the pen moves so fast, the intensity of the parallel lines in the bar graph is much lower than the intensity of the continuous trace. (The intensity is proportional to the width of each line, the width increasing as the speed of the stylus decreases since every point on the paper passed by the stylus is heated for a longer period of time.) The low-intensity lines in the bar graph do not obscure the graticule lines even though the lines are relatively close to each other in the case of a high sampling rate.

It is a feature of our invention, in the illustrative embodiment thereof, to utilize the single pen in a heat-sensitive type strip chart recorder most of the time for recording a first signal and for periodically recording line lengths representative of samples of a second signal, and moving the pen relative to the paper much faster during the line recording than during the continuous recording.

Further objects, features and advantages of our invention will become apparent upon consideration of the following detailed description in conjunction with the drawing, in which.

Figure 1:
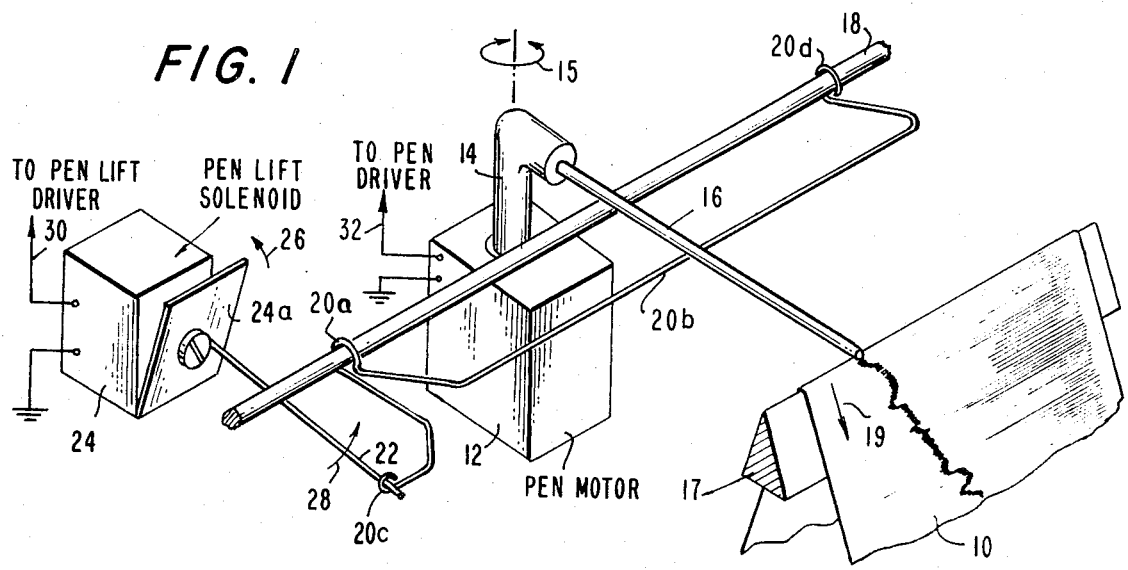
FIG. 1 depicts the mechanical elements in the illustrative embodiment of the invention.
Figure 2:
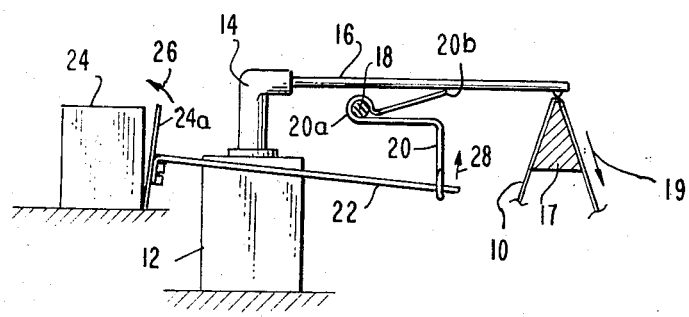
FIG. 2 is a side view of the apparatus of FIG. 1.

Referring to FIGS. 1 and 2, pen 16 is attached to shaft 14 of pen motor 12. Conductor 32 is connected to the output of a pen driver (pen driver 78 on FIG. 3) and depending on the magnitude of the pen driver signal shaft 14 rotates as shown by arrow 15. The larger the signal, the greater the clockwise rotation of the shaft as viewed from above the motor. The tip of pen 16 is maintained heated as is known in the art as it moves back and forth across paper 10. The paper is fed at a constant rate from a roll (not shown) over rod 17 in the direction shown by arrow 19. As the paper moves, the heated tip of the pen burns away the plastic coating on the paper to form a trace.

Figure 3:
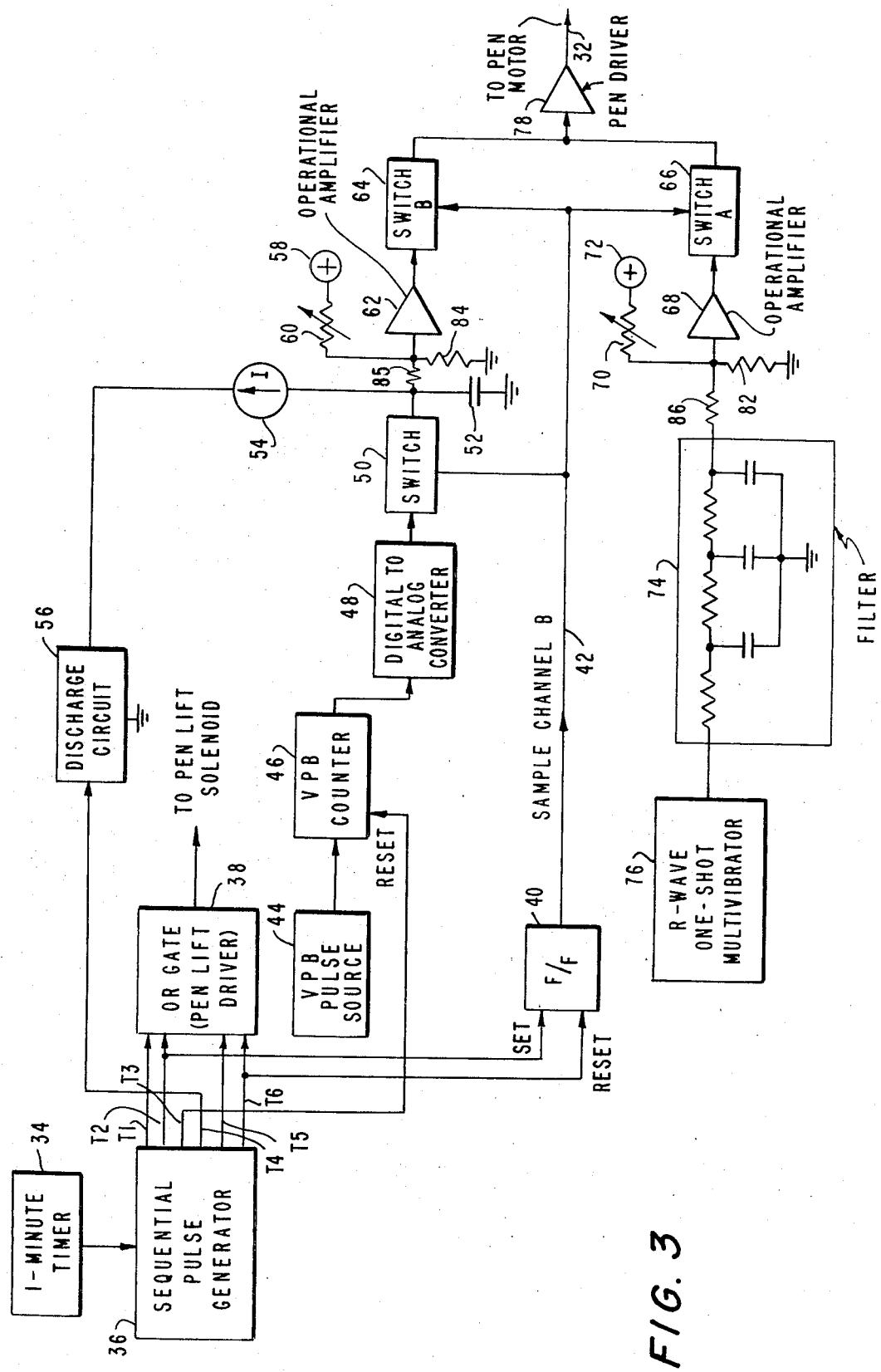
FIG. 3 depicts schematically the electronic circuit in the illustrative embodiment of the invention.

Pen lift solenoid 24 has an input terminal connected to the output of a pen lift driver (pen lift driver 38 on FIG. 3). Clapper 24a is hinged to the solenoid as shown and is normally in the position shown in FIGS. 1 and 2. To the front of the clapper there is connected a rod 28. The tip of this rod is contained in a hook 20c at one end of wire bail 20.

Shaft 18 is fixed as shown, and wire bail 20 is bent so that it is hinged to the shaft as shown at 20a and 20d. A portion 20b of the wire bail is disposed underneath pen 16. When the pen lift solenoid is operated, clapper 24a moves in the direction shown by arrow 26 to cause rod 22 to move in the direction shown by arrow 28. This causes the wire bail to rotate (counterclockwise in FIG. 2) around shaft 18 since the wire bail is hinged at 20a and 20d. When the wire bail rotates in this manner, section 20b bears up against the pen and lifts it from the paper. At this time, recording ceases.

Figure 5:
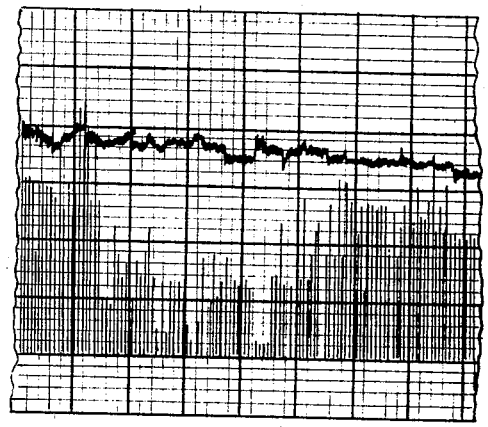
FIG. 5 illustrates a typical dual-signal trace of the type which can be made with the strip chart recorder of the invention.

The pen deflection drive is normally controlled by a slowly-changing signal (A) and the tip of the pen rests on the paper. Slow motion of the heated pen with respect to the paper causes a dark line to be traced on the heat-sensitive paper. This dark line is the heavy trace in FIG. 5. (The traces of FIG. 5 are recorded as the strip of paper moves to the left.) At 1-minute intervals the pen is lifted from the paper, and a sample of a second signal (B) is coupled to the pen deflection drive. The magnitude of the sample causes the pen to move to the top of the bar to be drawn. The pen is then lowered to the paper and the sample of signal B is allowed to decay to zero in a relatively short time (e.g., less than one second). As will be described, this is accomplished by storing the sample on a capacitor and discharging the capacitor with a constant current source. As the voltage on the capacitor decays, the pen traces out a vertical line, starting at a point proportional to the full magnitude of the sample and ending at the base line of the bar graph. At the conclusion of the stroke, the pen is lifted once again and the pen deflection drive is connected to signal A once again. The pen is lowered and signal A is recorded continuously for another one-minute interval.

The overall plot generated, as shown in FIG. 5, consists of a series of closely spaced vertical bars (samples of signal B) which are intersected by a darker continuous line (signal A). The heights of the individual bars correspond to the amplitudes of signal B as sampled at one-minute intervals. The position of each point on the continuous darker line above the base line reflects the magnitude of signal A at the time represented on the time (horizontal) axis. The relative positions of the bars and the continuous line are determined by bias controls to be described in connection with FIG. 3. It is possible to have the continuous trace above or below the bars, or superimposed on them (as shown). The bars are much lighter (less dense) than the continuous trace because of the rapid pen movement when a line is formed; the heat-sensitive plastic does not have enough time to fully melt off from the paper. Thus the original graticule markings on the paper remain visible in the background with the bar graph superimposed on them, even though samples of signal B are taken frequently relative to the rate of paper feed.

Figure 4:
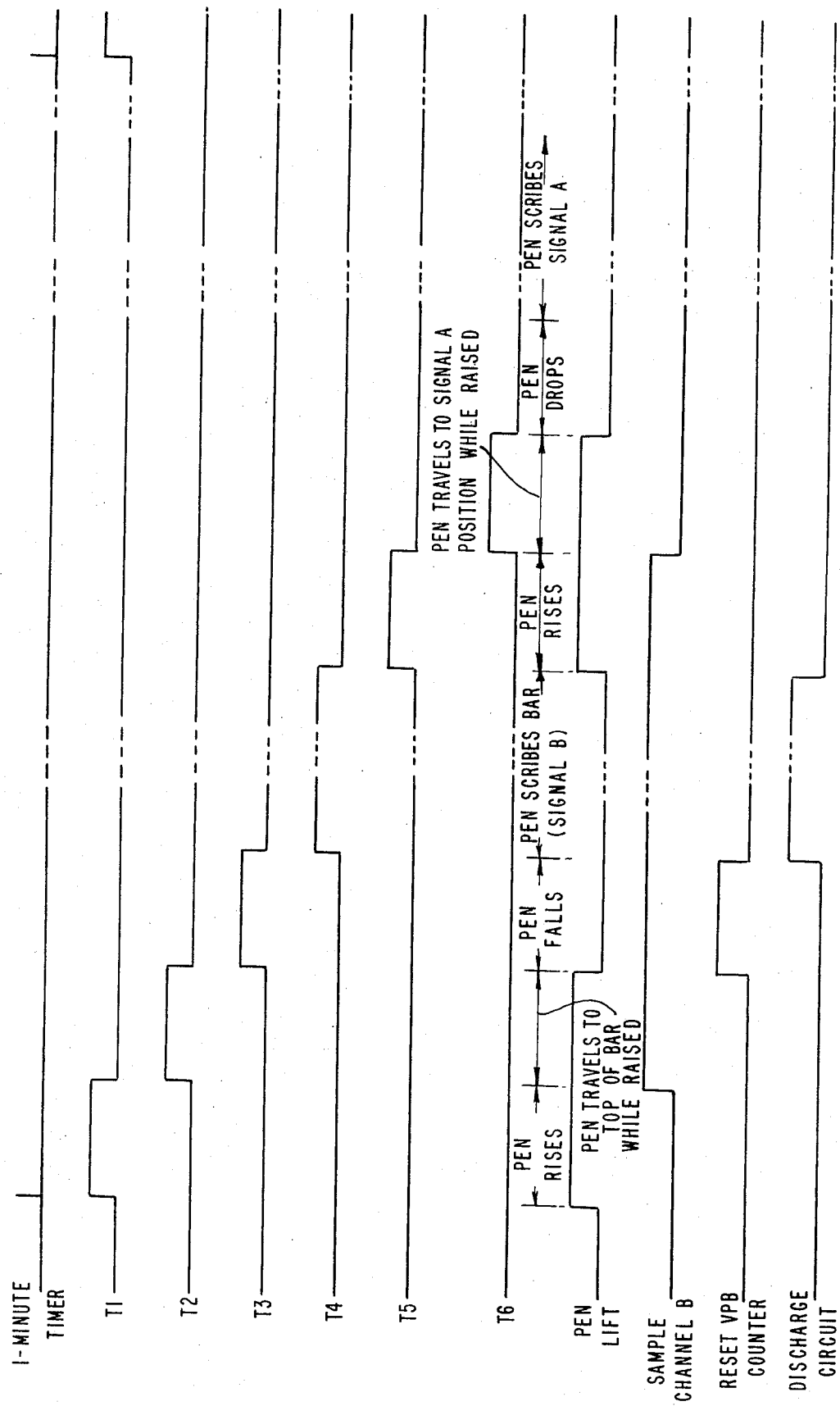
FIG. 4 is a timing diagram.

The circuit for controlling the operation of pen lift solenoid 24 and pen motor 12 is shown in FIG. 3. The system timing is controlled by 1-minute timer 34 and sequential pulse generator 36. At 1-minute intervals, the timer triggers the operation of the pulse generator. The pulse generator then generates six pulses on output conductors T1–T6. The pulse waveforms are shown in FIG. 4. Each of the T1-T3, T5 and T6 pulses is approximately 50 milliseconds in duration. Pulse T4 is approximately 800 milliseconds in duration. The six pulses are generated in sequence. (As is known by those skilled in the art, six successive one-shot multivibrators can be used for this purpose.) Following the generation of the T6 pulse, all six of the output conductors remain low in potential for approximately 59 seconds until the next 1-minute timer pulse starts the cycle once again. Thus all of the operations which are controlled by pulses T1–T6 occur in about 1 second.

The pen-lift signal, as shown in FIG. 4, is a function of the pulses on conductors T1, T2, T5 and T6. With the generation of pulse T1 at the start of each 1-minute interval, the pen rises. (A high level for the pen-lift signal is an indication that the pen is raised. Prior to this time the pen has been tracing signal A. But immediately after it is raised from the paper, during the time that the T2 pulse is generated the pen travels to the top of the next bar to be drawn. The pen is moved to a position from the base line which is proportional to the amplitude of the sample to be represented by the line now to be drawn. At the start of the T3 pulse, the pen is allowed to fall. Thereafter, during the 800-millisecond T4 pulse, the pen moves quickly toward the base line and scribes a bar whose length represents a sample of signal B. At the start of the T5 pulse, the pen rises. Once the pen is raised, it travels to a position dependent upon the amplitude of signal A during the 5-millisecond T6 pulse. Thereafter, the pen drops once again and begins to scribe signal A. After approximately 59 seconds of recording signal A, the cycle starts over once again.

In the illustrative embodiment of the invention, the continuous trace is a plot of heart rate. Each time a QRS complex is detected (this occurs about once or twice per second when a patient is being monitored), a pulse is generated. Each pulse is of the same amplitude and width, and the succession of pulses are integrated. Thus the output of the integrator (filter) is a signal (A) proportional to the heart rate. The system also monitors ventricular premature beats (VPB's) and once a minute the number of VPB's detected during the preceding one-minute interval is converted to an analog signal. This analog signal (B) is used to control the length of a bar recorded in the bar graph.

Referring to FIG. 4, when the T2 pulse is generated channel B is sampled. This means that the number of VPB's detected during the preceding 1-minute interval is converted to a voltage level. It is this level that causes the pen to travel to the top of the bar next to be drawn. The sample channel B signal terminates with the leading edge of the T6 pulse. (This is merely a matter of convenience; the signal is not required after the pen has traveled to the top of the bar to be drawn.) The analog signal is developed in the first place by counting the VPB's during each one-minute interval and then converting them to an analog level which is used to move the pen to the top of the bar to be drawn. The counter must be reset after each sample is taken so that a new count can begin. The reset VPB counter signal (the T3 pulse) shown in FIG. 4 resets the counter at the same time that the pen is allowed to fall toward the paper after it has been moved to the top of the bar to be drawn.

The discharge circuit signal on FIG. 4, as will be described with reference to FIG. 3, is simply a circuit which allows the signal sample on the storage capacitor to decay. As the voltage on the capacitor decays, a bar is drawn. The discharge circuit signal is therefore generated during that time that the bar is actually drawn, that is, during the T4 pulse.

Referring to the circuit of FIG. 3, VPB pulse source 44 generates a pulse each time a VPB is detected, and the pulse increments the count in VPB counter 46. The count is reset when a T3 pulse from sequential pulse generator 36 is applied to the counter reset input. The output of the counter is extended to the input of digital-to-analog converter 48 and the output of the converter is an analog signal which is fed through normally closed switch 50 to capacitor 52 for controlling the recording of a proportional line length when the capacitor voltage is used to drive the pen.

The R-wave one-shot multivibrator 76 generates a pulse each time the R-wave of an ECG waveform is detected. The pulses are smoothed by filter 74 and consequently the input to operational amplifier 68 though resistor 86 is a signal whose magnitude is proportional to the average heart rate. Potential source 72 is connected through potentiometer 70 and resistor 82 to ground, with the junction of the potentiometer and the resistor also being connected to the input of operational amplifier 68. The setting of the potentiometer controls the bias of signal A, that is, the average value of the dark continuous trace relative to the base line. The output of the operational amplifier is extended to switch 66. This switch is normally closed and allows signal A (the output of operational amplifier 68) to be extended to the input of pen driver 78. The output of the pen driver is extended over conductor 32 to the pen motor (FIG. 1) and thus in the absence of a "sample channel B" signal on conductor 42 a continuous recording is made of the average heart rate.

Each time one-minute timer 34 applies a pulse at the input of sequential pulse generator 36, the sequential pulses shown on FIG. 4 are generated on conductors T1–T6. Conductors T1, T2, T5 and T6 are extended to respective inputs of OR gate 38. This OR gate functions as the pen lift driver and its output conductor 30 is extended to the pen lift solenoid (FIG. 1). The solenoid is operated, thereby lifting the pen, during the T1, T2, T5 and T6 pulse intervals. This is shown by the pen-lift signal of FIG. 4.

The T2 conductor is also coupled to the set input of flip-flop 40. The output of the flip-flop is ordinarily low but goes high when it is set. Thus the "sample channel B" signal goes high at the start of the T2 pulse. When the signal goes high, switch 66 is opened and consequently signal A is no longer extended to the input of the pen driver. The high signal on conductor 42 causes switch 50 to open. This normally closed switch charges the capacitor 52 to the voltage representing the top of the bar to be drawn. When the switch opens, the capacitor holds the charge. Since the capacitor is connected to the input of operational amplifier 62 through resistor 85, the output of the operational amplifier is proportional to the magnitude of the bar. Potential source 58, potentiometer 60 and resistor 84 function as a bias control for the bar recording, and determine the level of the base line of the bar graph.

The high signal on conductor 42 is also extended to the input of switch 64. This switch is closed only when switch 66 is open, and extends the signal at the output of operational amplifier 62 to the input of pen driver 78. Consequently, as soon as flip-flop 40 is set (at the leading edge of the T2 pulse), the pen, which has already been lifted from the paper, moves to a position which will be at the top of the bar now to be drawn.

During pulse T3, OR gate 38 does not operate and the pen falls. The T4 pulse does not operate OR gate 38 either, but it does operate discharge circuit 56. The discharge circuit is simply a switch which allows current to flow from constant current source 54 to ground. As the current flows, capacitor 52 is discharged. The discharge, even for a maximum voltage sample on capacitor 52, requires less than 800 milliseconds. As the capacitor discharges, its voltage decreases and the input to the pen driver falls. The pen thus scribes a bar on the paper. The capacitor is discharged very fast and it is the rapid movement of the pen as the bar is drawn which causes a relatively low-intensity line to be drawn.

At the end of the T4 pulse, when the T5 pulse is generated, OR gate 38 operates once again. The pen is lifted from the paper. The leading edge of the T6 pulse resets flip-flop 40 so that conductor 42 goes low in potential. At this time switch 64 opens, and switches 50 and 66 close so that signal A is applied once again to the input of the pen driver. During the T6 pulse, the pen is still in a raised position since the pen should move before it is lowered from the bottom of the bar which has just been drawn to the signal A position. At the end of the T6 pulse, OR gate 38 turns off, the pen is allowed to fall, and signal A recording begins once again. During the next 59 seconds of signal A recording, VPB counter 46, which was reset when the T3 pulse was generated (while the storage capacitor 52 was disconnected from the digital to analog converter 48), counts VPB's again and charges capacitor 52 so that another signal B sample will be available when the next bar is to be drawn.

It should be noted that whenever the pen is traveling toward a new position — during pulse time T2 as it travels to the top of the bar to be drawn and during pulse time T6 as it travels to the signal A position — the pen is raised. This is to avoid interference between the two recordings. Each pen travel is preceded by a pen rise interval (pulses T1 and T5), and each pen travel is succeeded by a pen falling interval (during pulse T3, and the initial interval immediately after pulse T6), which in turn is followed by the scribing of a signal (during pulse T4, and the 59 seconds or so prior to the next one-minute pulse).

Although the invention has been described with reference to a particular embodiment, it is to be understood that this embodiment is merely illustrative of the application of the principles of the invention. For example, instead of using heat-sensitive paper and a hot pen, it is possible to use inkpen recorders. If a light ink is used, the fast speed of the pen when a bar is being drawn will result in a light line being drawn (as opposed to the much heavier line which is drawn for signal A). In this case also the graticule markings show through the bar graph even for a paper feed rate which is low relative to the sampling rate. Also, instead of discharging capacitor 52 to control the drawing of a line, it is possible to maintain the sample voltage across the capacitor as the line is drawn. In such case, a second capacitor can be provided, and during pulse T4 this capacitor can be charged (rather than discharged). This second capacitor is actually used to drive the pen through amplifier 62. The line is thus drawn upward from the base line. As soon as the voltage across the second capacitor equals the voltage across capacitor 52, a comparator can be used to cause the charging to terminate (thus determining the upper end of the line). To reset the circuit, the second capacitor must be discharged after each cycle and this can be accomplished during pulse T6. Thus it is to be understood that numerous modifications may be made in the illustrative embodiment of the invention and other arrangements may be devised without departing from the spirit and scope of the invention.

What we claim is:

1. A strip chart recorder comprising means for moving continuously a paper strip, pen means normally for recording a trace of a first signal on the moving paper strip, means for periodically sampling a second signal, means operative after the sampling of said second signal for controlling said pen means to record a line of a bar graph the length of which is dependent upon the magnitude of a sample taken previously, and means for causing said pen means to move substantially faster when recording a line of said bar graph than when recording said trace such that the final recording on said paper strip has an intensity for the trace of said first signal which is substantially greater than the intensity of the lines in said bar graph.

2. A strip chart recorder in accordance with claim 1 wherein said paper is heat-sensitive paper and said pen means includes a heated tip, and further including means for lifting said pen means from said paper both prior to and after the drawing on said paper of any line of said bar graph.

3. A strip chart recorder in accordance with claim 2 wherein said controlling means causes said pen to be moved to a position on said paper corresponding to one end of any line to be drawn, and thereafter causes said pen to move from said position on said paper to the other end of said line to be drawn on said paper a distance corresponding to the amplidude of the respective sample.

4. A strip chart recorder in accordance with claim 3 wherein said controlling means includes a capacitor, means for applying a voltage across said capacitor which is dependant upon the amplitude of a sample, and means for controlling the drawing of a line by said pen means of a length which is proportional to the magnitude of the voltage across said capacitor.

5. A strip chart recorder in accordance with claim 4 further including means for adjusting the base line of said bar graph and the average value of the trace recorded on said paper relative to each other such that the separation and superposition of said trace and said bar graph can be varied.

6. A strip chart recorder in accordance with claim 5 wherein said paper includes mutually perpendicular graticule markings, said pen means is moved fast enough during the recording of a line such that said graticule markings are readily observable in the region of said bar graph, and the intensity of said trace is great enough such that the drawing of said lines with substantially the same intensity would obscure said graticule markings.

7. A strip chart recorder in accordance with claim 6 wherein said first signal is derived from the continuous cardiographic monitoring of a patient, and the samples of said second signal are proportional to a count of the number of events of a specified nature which occur between the taking of successive samples.

8. A strip chart recorder in accordance with claim 3 wherein said first signal is derived from the continuous cardiographic monitoring of a patient, and the samples of said second signal are proportional to a count of the number of events of a specified nature which occur between the taking of successive samples.

9. A strip chart recorder in accordance with claim 3 wherein said paper includes mutually perpendicular graticule markings, said pen means is moved fast enough during the recording of a line such that said graticule markings are readily observable in the region of said bar graph, and the intensity of said trace is great enough such that the drawing of said lines with substantially the same intensity would obscure said graticule markings.

10. A strip chart recorder in accordance with claim 3 further including means for adjusting the base line of said bar graph and the average value of the trace recorded on said paper relative to each other such that the separation and superposition of said trace and said bar graph can be varied.

11. A strip chart recorder in accordance with claim 10 wherein said paper includes mutually perpendicular graticule markings, said pen means is moved fast enough during the recording of a line such that said graticule markings are readily observable in the region of said bar graph, and the intensity of said trace is great enough such that the drawing of said lines with substantially the same intensity would obscure said graticule markings.

12. A strip chart recorder in accordance with claim 11 wherein said first signal is derived from the continuous cardiographic monitoring of a patient, and the samples of said second signal are proportional to a count of the number of events of a specified nature which occur between the taking of successive samples.

13. A strip chart recorder in accordance with claim 10 wherein said first signal is derived from the continuous cardiographic monitoring of a patient, and the samples of said second signal are proportional to a count of the number of events of a specified nature which occur between the taking of successive samples.

14. A strip chart recorder in accordance with claim 2 further including means for adjusting the base line of said bar graph and the average value of the trace recorded on said paper relative to each other such that the separation and superposition of said trace and said bar graph can be varied.

15. A strip chart recorder in accordance with claim 14 wherein said paper includes mutually perpendicular graticule markings, said pen means is moved fast enough during the recording of a line such that said graticule markings are readily observable in the region of said bar graph, and the intensity of said trace is great enough such that the drawing of said lines with substantially the same intensity would obscure said graticule markings.

16. A strip chart recorder in accordance with claim 15 wherein said first signal is derived from the continuous cardiographic monitoring of a patient, and the samples of said second signal are proportional to a count of the number of events of a specified nature which occur between the taking of successive samples.

17. A strip chart recorder in accordance with claim 14 wherein said first signal is derived from the continuous cardiographic monitoring of a patient, and the samples of said second signal are proportional to a count of the number of events of a specified nature which occur between the taking of successive samples.

18. A strip chart recorder in accordance with claim 1 wherein said controlling means causes said pen to be moved to a position on said paper corresponding to one end of any line to be drawn, and thereafter causes said pen to move from said position on said paper to the other end of said line to be drawn on said paper a distance corresponding to the amplitude of the corresponding sample.

19. A strip chart recorder in accordance with claim 18 wherein said controlling means includes a capacitor, means for applying a voltage across said capacitor which is dependent upon the amplitude of a sample, and means for controlling the drawing of a line by said pen means of a length which is proportional to the magnitude of the voltage across said capacitor.

20. A strip chart recorder in accordance with claim 19 further including means for adjusting the base line of said bar graph and the average value of the trace recorded on said paper relative to each other such that the separation and superposition of said trace and said bar graph can be varied.

21. A strip chart recorder in accordance with claim 20 wherein said paper includes mutually perpendicular graticule markings, said pen means is moved fast enough during the recording of a line such that said graticule markings are readily observable in the region of said bar graph, and the intensity of said trace is great enough such that the drawing of said lines with substantially the same intensity would obscure said graticule markings.

22. A strip chart recorder in accordance with claim 21 wherein said first signal is derived from the continuous cardiographic monitoring of a patient, and the samples of said second signal are proportional to a count of the number of events of a specified nature which occur between the taking of successive samples.

23. A strip chart recorder in accordance with claim 1 further including means for adjusting the base line of said bar graph and the average value of the trace recorded on said paper relative to each other such that the separation and superposition of said trace and said bar graph can be varied.

24. A strip chart recorder in accordance with claim 23 wherein said paper includes mutually perpendicular graticule markings, said pen means is moved fast enough during the recording of a line such that said graticule markings are readily observable in the region of said bar graph, and the intensity of said trace is great enough such that the drawing of said lines with substantially the same intensity would obscure said graticule markings.

25. A strip chart recorder in accordance with claim 24 wherein said first signal is derived from the continuous cardiographic monitoring of a patient, and the samples of said second signal are proportional to a count of the number of events of a specified nature which occur between the taking of successive samples.

26. A strip chart recorder in accordance with claim 1 wherein said paper includes mutually perpendicular graticule markings, said pen means is moved fast enough during the recording of a line such that said graticule markings are readily observable in the region of said bar graph, and the intensity of said trace is great enough such that the drawing of said lines with substantially the same intensity would obscure said graticule markings.

27. A strip chart recorder in accordance with claim 26 wherein said first signal is derived from the continuous cardiographic monitoring of a patient, and the samples of said second signal are proportional to a count of the number of events of a specified nature which occur between the taking of successive samples.

28. A strip chart recorder in accordance with claim 1 wherein said first signal is derived from the continuous cardiographic monitoring of a patient, and the samples of said second signal are proportional to a count of the number of events of a specified nature which occur between the taking of successive samples.

* * * * *